(12) United States Patent
Brammer et al.

(10) Patent No.: US 6,532,795 B1
(45) Date of Patent: Mar. 18, 2003

(54) VIBRATION PICKUP WITH A PRESSURE SLEEVE

(75) Inventors: Hartmut Brammer, Vaihingen (DE); Wolfgang Schmidt, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/323,789

(22) Filed: Jun. 2, 1999

(30) Foreign Application Priority Data

Jul. 1, 1998 (DE) .......................................... 198 29 407

(51) Int. Cl.[7] ................................................. G01L 23/22
(52) U.S. Cl. .......................................... 73/35.11; 73/654
(58) Field of Search .............................. 73/35.11, 654, 73/35.09; 310/329; 123/435

(56) References Cited

U.S. PATENT DOCUMENTS

| | | | |
|---|---|---|---|
| 4,944,179 A | | 7/1990 | Komurasaki ................. 73/654 |
| 5,398,540 A | * | 3/1995 | Entenmann et al. ....... 73/35.11 |
| 5,440,933 A | * | 8/1995 | Brammer et al. .......... 73/35.11 |
| 5,739,418 A | * | 4/1998 | Hackel et al. ............. 73/35.11 |
| 5,798,453 A | * | 8/1998 | Brammer et al. .......... 73/35.11 |
| 5,872,307 A | * | 2/1999 | Brammer et al. .......... 73/35.11 |

FOREIGN PATENT DOCUMENTS

| | | |
|---|---|---|
| DE | 44 03 660 A | 10/1994 |
| DE | 195 24 152 C | 5/1996 |
| DE | 195 24 148 C | 8/1996 |
| DE | 195 42 729 C | 10/1996 |
| DE | 195 24 147 A1 | 1/1997 |

* cited by examiner

Primary Examiner—Helen Kwok
(74) Attorney, Agent, or Firm—Michael J. Striker

(57) ABSTRACT

A vibration pickup has a pressure sleeve mountable directly or indirectly on a component which causes vibrations, a sensor element which is held radially outwardly on the pressure sleeve with an axial pre-tensioning and is electrically contactable, a spring element holding the sensor element on the pressure sleeve with the axial pre-tensioning, the spring element including at least one ring-shaped spring which is held on an outer wall of the pressure sleeve so that an inner periphery of the spring abuts directly or indirectly on the pressure sleeve over at least three regions with a mechanical tensioning.

14 Claims, 2 Drawing Sheets

VIBRATION PICKUP WITH A PRESSURE SLEEVE

BACKGROUND OF THE INVENTION

The present invention relates to a vibration pickup with a pressure sleeve.

Vibration pickups of the above mentioned general type are known in the art. One of such vibration pickups with a pressure sleeve is disclosed for example in the German patent document DE 195 24 147.9. It is formed as a knock sensor for monitoring the operation of an internal combustion engine in a motor vehicle. The pressure sleeve is joined through an abutment region fixedly to a component which causes vibrations, for example a motor block of the internal combustion engine.

The vibrations to be detected are knock noises of the internal combustion engine during the operation. They are transmitted through a pressure sleeve to a piezo-ceramic disk as a sensor element with intermediately located contact disks and insulating disks which allow picking up of the signal, so as to form an evaluatable electrical output signal.

This type of mounting or clamping of the sensor element on the pressure sleeve and the mounting of the pressure sleeve on the vibrating component has a great influence on the manufacture. The clamping of the sensor element together with a plurality of individual components, for example with a spring and a seismic mass is performed in the known vibration pickup with a threaded ring which is screwed on the corresponding thread of the pressure sleeve and directly abuts on the seismic mass.

The known threaded ring and thread on the pressure sleeve is a substantial cost factor. In particular, the chips are produced during thread cutting, which can lead after the injection molding of the device to short circuiting. All components must be fixedly compressed in the case of occurring acceleration with definite mechanical pretensioning and retained in this way. When the pretensioning changes, the transmission characteristic line changes and thereby makes the evaluation difficult.

SUMMARY OF THE INVENTION

Accordingly, it is an object of the present invention to provide a vibration pickup with a pressure sleeve, which avoids the disadvantages of the prior art.

In keeping with these objects and with others which will become apparent hereinafter, one feature of present invention resides, briefly stated, in a vibration pickup with a pressure sleeve, in which a substantially ring-shaped spring is held on an outer wall of the pressure sleeve so that the inner periphery of the spring end abuts against the pressure sleeve with at least three regions, directly or indirectly with mechanical tensioning.

When the vibration pickup is designed in accordance with the present invention it has the advantage that it can be produced with relatively simple manufacturing steps and can therefore have a great strength. Since the substantially plate-shaped spring is held at the outer edge of the pressure sleeve by non-circular portion of the inner contour directly or indirectly, the spring abuts against the pressure sleeve on several regions with pretensioning and for example a special threaded ring for mounting of the components of the pressure sleeve can be dispensed with.

In accordance with a preferable embodiment of the present invention, between the spring and the pressure sleeve at least three pins are driven at uniform distances and the inner contour is correspondingly elastically deformed. The pins can have a square or a rectangular and or also a round cross-section. An especially simple insertion of the pin is performed when the pin is wedge shaped and has a cross-section which reduces in direction toward the spring.

In accordance with another advantageous embodiment of the invention, at least three radially inwardly located projections in the substantially ring-shaped spring are held on the outer wall of the pressure sleeve with pretensioning. Projections can be web-shaped and extend in the inner diameter. However, it can be also formed by concave or convex portions which are straight and deviate from the circular inner contour.

An especially reliable holding of the spring on the pressure sleeve is guaranteed when the spring is welded on the projections with the pressure sleeve. Preferably, the welding is performed by a laser welding technique.

In accordance with a preferable embodiment of the invention, the vibration pickup is formed as a knock sensor for vibrations on the motor block of an internal combustion engine in a motor vehicle.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
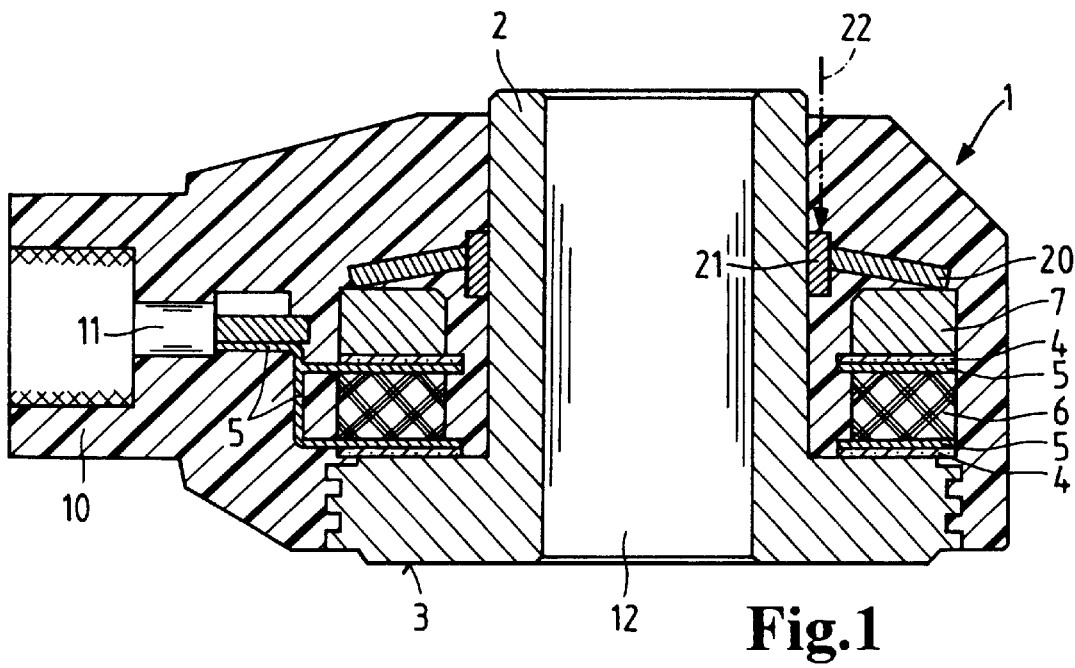
FIG. 1 is a section through a knock sensor housing formed as a vibration pickup and provided with a spring which is clamped by pins on a pressure sleeve.

FIG. 1 shows a vibration pickup which is formed as a knock sensor for an internal combustion engine. It has an outer synthetic plastic housing 1, and a pressure sleeve 2 arranged in the housing. The pressure sleeve 2 abuts at its lower surface 3 on a not shown motor block, whose vibrations must be detected.

The following parts are arranged on the outer periphery of the pressure sleeve 2 starting from the lower edge: an insulating disk 4, a first contact disk 5, a piezo-ceramic disk 6 which is a sensor element, and moreover a second contact disk 5 as well as a second insulating disk 4. A seismic mass 7 is placed on this arrangement. It is pressed by a ring-shaped spring 20 in direction toward the piezo-ceramic disk 6. Pins 21 are inserted in an axial direction in accordance with the arrow 22 between the periphery of the spring 20 and the wall of the pressure sleeve 2.

Figure 2:
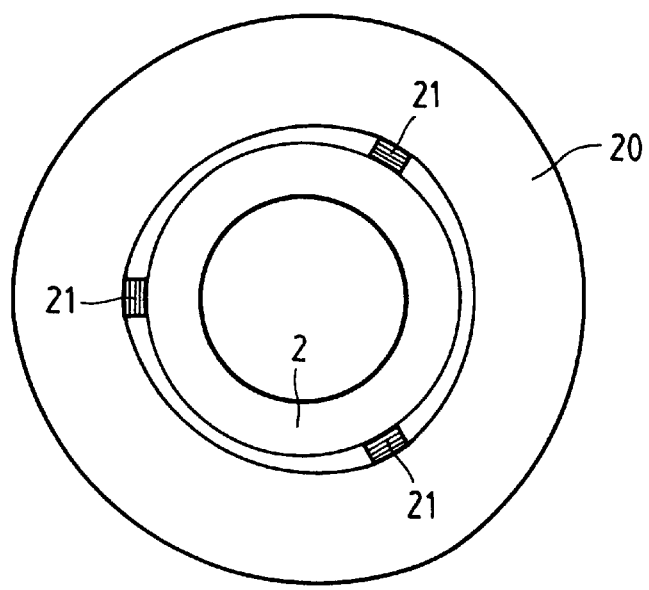
FIG. 2 shows a plan view of the clamped-in spring of FIG. 1.

The spring 20 which is clamped this way inside is shown in a plan view of FIG. 2. It provides the axial pretensioning which is required for the sensor element 6 and serves simultaneously for providing a reliable and durable connection of the above described components.

The housing 1 which is preferably composed of synthetic plastic material produced by injection molding has an integrated connection part 10. An electrical connection 11 for the contact disks 5 is injection molded in the integrated connection part 10. The electrical connection 11 is formed of one piece with the corresponding contact disk 5. Therefore an electrical connection is provided through both contact disks 5 to the both sides of the piezo-ceramic disk 6. The electrical voltage which is produced in response to pressure on the piezo-ceramic disk 6 is taken up at the connections 1 1.

The pressure sleeve 2 has a central recess formed as an opening 12. A not shown mounting screw extends through the opening 12 and connects the knock sensor as a whole directly or indirectly with the motor block of the internal combustion engine. During mounting of the knock sensor the entire torque which is applied by the above-described mounting screws for the mounting on the motor block is transmitted to the pressure sleeve 2 through the upper surface 3. In other words, no force acts on the piezo-ceramic disk 6 as a sensor element during the mounting.

A pre-tensioning force acts here by the pressure of the spring 20 which is held with the inserted pins 21 on the pressure sleeve 2. The prestressing force is selected so that the produced axial forces act on the piezo-ceramic disk 6 directly without remaining worsening of the electrical signal. They are also substantially independent from thermal expansions as well as unavoidable upsetting of the pressure sleeve 2 during the mounting. The pulses produced by the seismic mass 7 proportionally to the vibrations of the internal combustion engine are converted in the piezo-ceramic disk 6 into voltage pulses which are readable on the corresponding measuring device.

Figure 3:
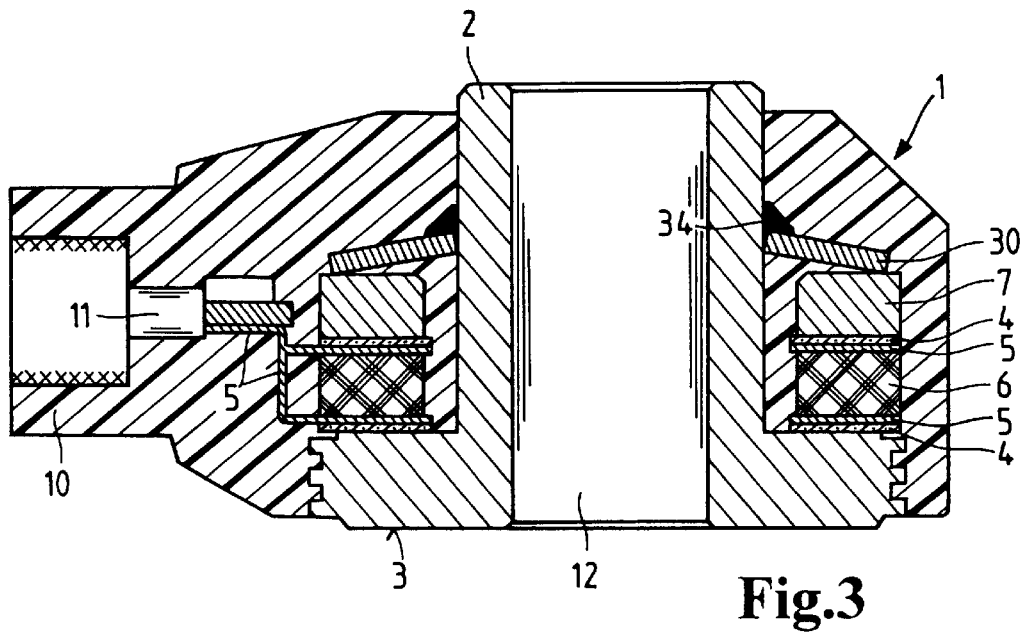
FIG. 3 is a view showing a section through a knock sensor housing formed as the vibration pickup, with a clamped and welded spring on the pressure sleeve.
Figure 4:
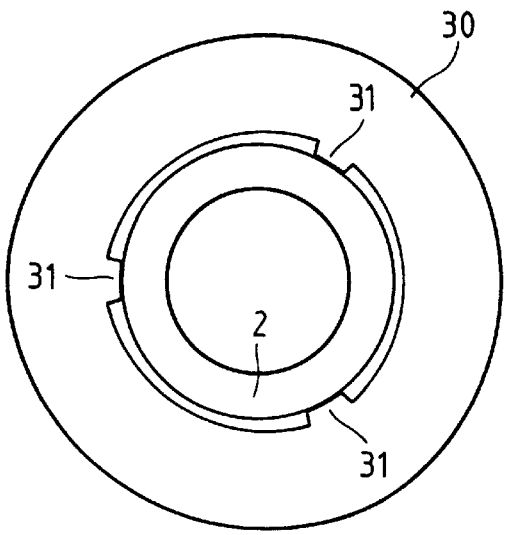
FIG. 4 is a plan view of a spring with web-like projections for clamping of the pressure sleeve.
Figure 5:
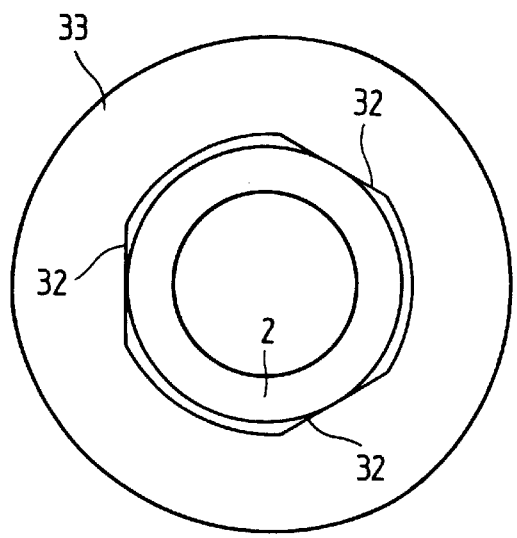
FIG. 5 is a plan view of a spring with an inner contour for clamping-in on the pressure sleeve, which deviates from a circular shape.

FIG. 3 shows a further embodiment of the inventive vibration pickup with a ring-shaped spring 30. The spring 30 has a web-shaped projection 31 on the inner contour, as can be seen from FIG. 4. FIG. 5 shows portions 32 which deviate from the circular inner contour in a spring 33. The spring 30 and 33 are clamped over the outer periphery of the pressure sleeve 2 and thereby hold the above described assembly of the components with a pre-tensioning. Alternatively, the corresponding spring 30 or 33 can be welded on the pressure sleeve 2, for example by laser welding, in points 34 to improve the holding ability.

The above described arrangement of correspondingly two pins 21 or projections 31, 32 makes possible a pre-tensioning of the springs 20, 30 or 33 at the points which are offset by 120° over the periphery of the pressure sleeve 2. It is of course possible to provide more pins 21 or projections 31, 32.

It will be understood that each of the elements described above, or two or more together, may also find a useful application in other types of constructions differing from the types described above.

While the invention has been illustrated and described as embodied in vibration pickup with a pressure sleeve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A vibration pickup, comprising a pressure sleeve mountable directly or indirectly on a component which causes vibrations; a sensor element which is held radially outwardly on said pressure sleeve with an axial pre-tensioning and is electrically contactable; spring means for holding said sensor element on said pressure sleeve with the axial pre-tensioning, said spring means including at least one substantially ring-shaped spring which is held on an outer wall of said pressure sleeve and has an inner periphery formed so that it abuts directly or indirectly on said pressure sleeve over at least three regions with a mechanical tensioning.

2. A vibration pickup as defined in claim 1, wherein said substantially ring-shaped spring is held on an outer wall of said pressure sleeve so that at least three radially inwardly located projections abut against said pressure sleeve with the mechanical tensioning.

3. A vibration pickup as defined in claim 2, wherein said projections are web-shaped and extend into an inner diameter of said spring.

4. A vibration pickup as defined in claim 2, wherein said projections are formed by portions which deviate from a circular inner contour of said spring.

5. A vibration pickup as defined in claim 4, wherein said portions which form said projections are straight.

6. A vibration pickup as defined in claim 4, wherein said portions which form said projections are convex.

7. A vibration pickup as defined in claim 4, wherein said portions which form said projections are concave.

8. A vibration pickup as defined in claim 2, wherein said spring is welded at least on said projections with said pressure sleeve.

9. A vibration pickup as defined in claim 1, wherein said pressure sleeve is formed so that it is mountable on the component which is formed as a motor block of an internal combustion engine in a motor vehicle.

10. A vibration pickup, comprising a pressure sleeve mountable directly or indirectly on a component which causes vibrations; a sensor element which is held radially outwardly on said pressure sleeve with an axial pre-tensioning and is electrically contactable; spring means for holding said sensor element on said pressure sleeve with the axial pre-tensioning, said spring means including at least one substantially ring-shaped spring which is held on an outer wall of said pressure sleeve so that an inner periphery of said spring abuts directly or indirectly on said pressure sleeve over at least three regions with a mechanical tensioning; and at least three pins arranged between said spring and said pressure sleeve at substantially uniform distances.

11. A vibration pickup as defined in claim 10, wherein said pins have a square cross-section.

12. A vibration pickup as defined in claim 10, wherein said pins have a rectangular cross-section.

13. A vibration pickup as defined in claim 10, wherein said pins have a round cross-section.

14. A vibration pickup as defined in claim 10, wherein said pins are wedge-shaped.

* * * * *